UNITED STATES PATENT OFFICE.

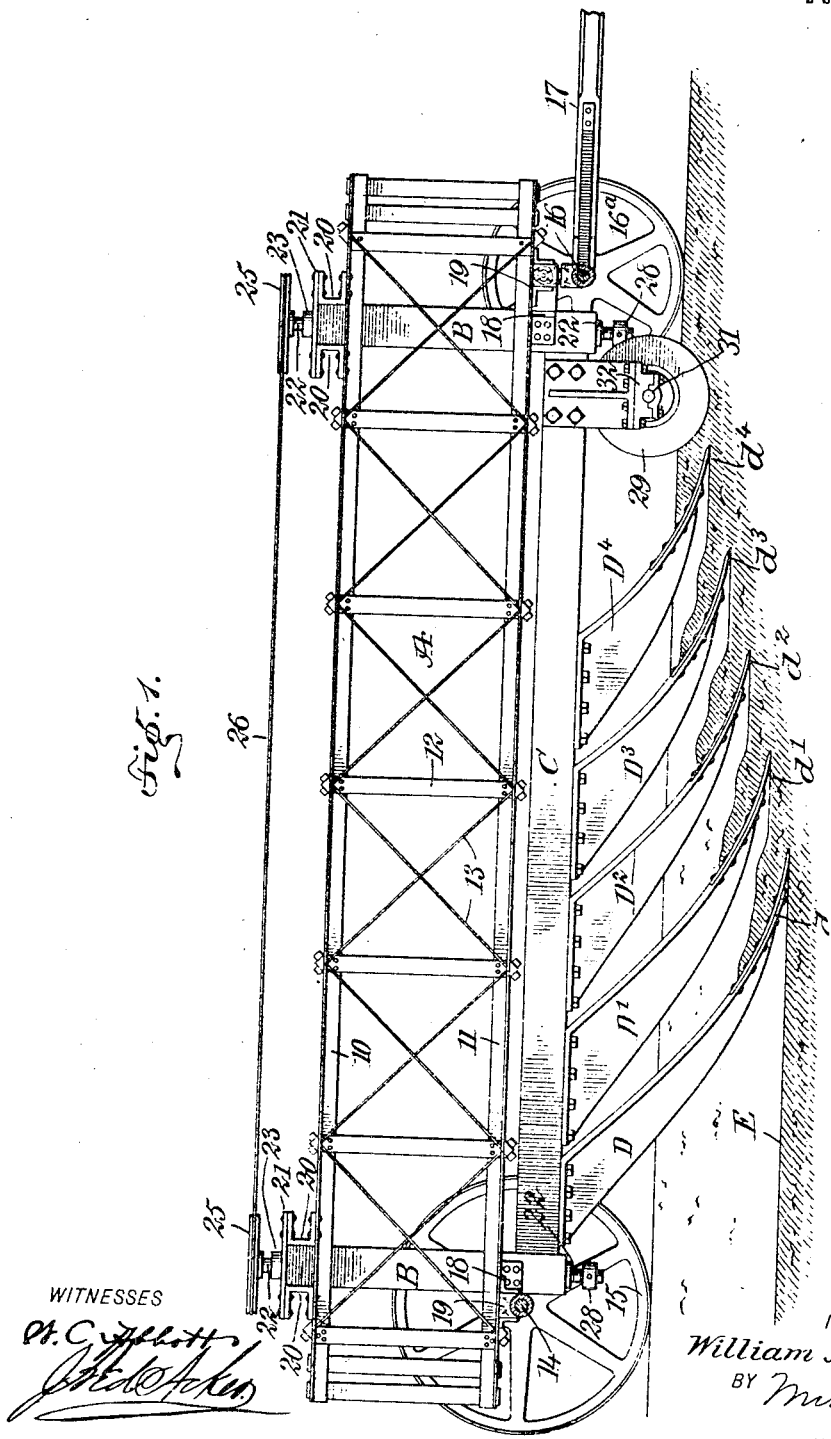

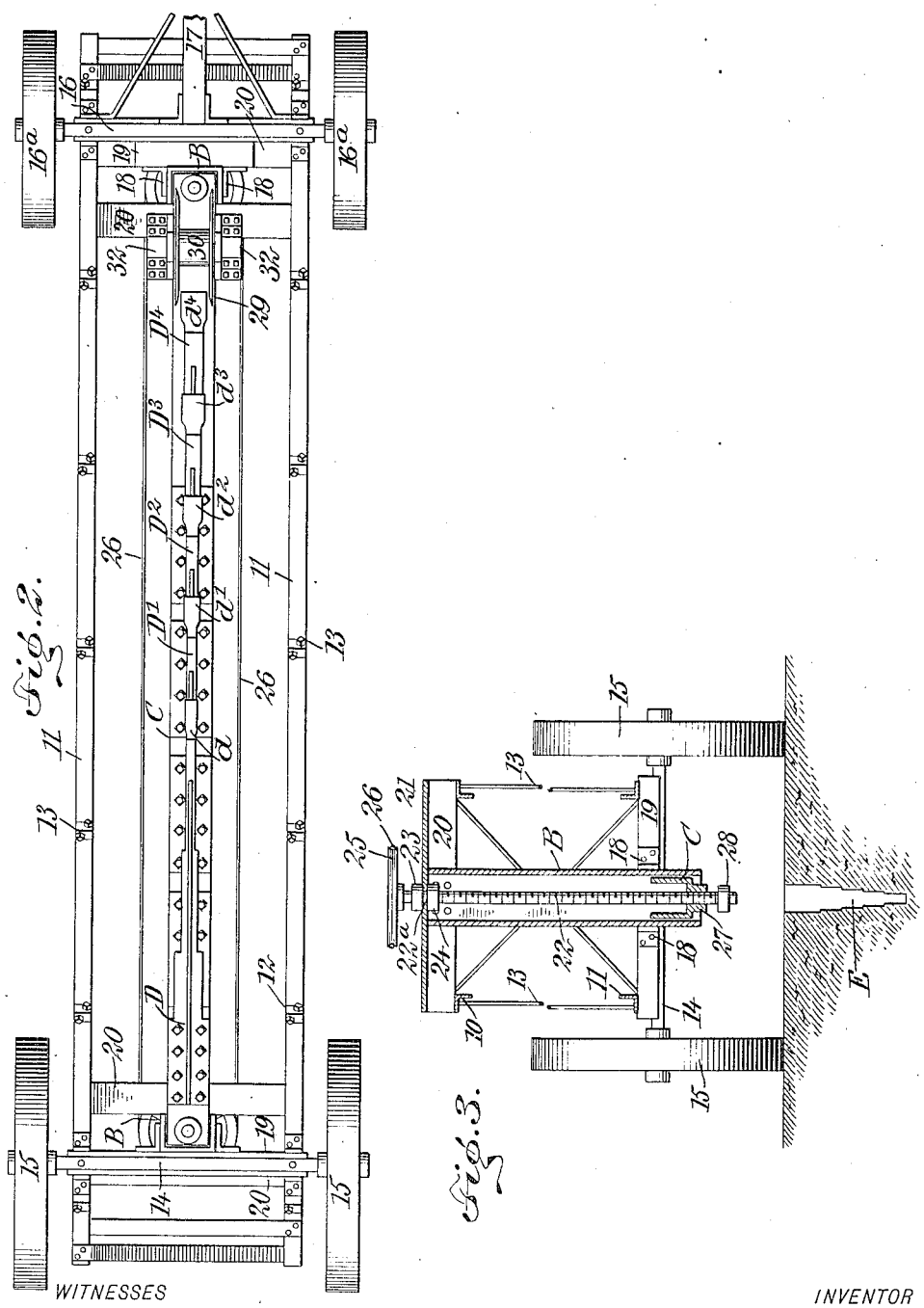

WILLIAM MAULTBY BENSON, OF NEWPORT, PENNSYLVANIA.

GROOVING AND DITCHING PLOW.

No. 843,386.    Specification of Letters Patent.    Patented Feb. 5, 1907.

Application filed May 21, 1906. Serial No. 317,942.

*To all whom it may concern:*

Be it known that I, WILLIAM MAULTBY BENSON, a citizen of the United States, and a resident of Newport, in the county of Perry and State of Pennsylvania, have invented a new and Improved Grooving and Ditching Plow, of which the following is a full, clear, and exact description.

The purpose of the invention is to provide a tandem gang grooving-plow, particularly adapted for use in semi-arid land, and to so construct the implement that the plows are set tandem or one directly behind the other, each consecutive plow-point being set deeper in the furrow than the preceding one for the purpose of producing a deep groove at one operation, and wherein also the plow-points are of graduated width, the lowest being the narrowest and the uppermost one the widest. Thus each point has a comparatively small amount of ground to plow up, and the side walls of the grooves are not torn up and loosened as they would be if but a single plow were used to make a deep cut at one operation, and also comparatively little power is needed to draw the plow when constructed as above.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a sectional side elevation of the improved plow. Fig. 2 is a bottom plan view of the plow, and Fig. 3 is a transverse vertical section thereof.

The body A of the plow is preferably of skeleton construction, and, as illustrated, it consists of upper and lower parallel side beams 10 and 11 of angle-iron, vertical side beams 12, and any desired number of transverse connecting-beams, together with cross-braces 13, as is best shown in Fig. 1. The body A is provided with a rear axle 14, having suitable supporting-wheels 15 mounted thereon, and a forward pivoted axle 16, also provided with proper supporting-wheels 16ª and with a draft tongue or pole 17.

Adjacent to the forward and the rear axle, about midway between the sides of the body A, guide-columns B are perpendicularly placed, extending above and below the said body, as is shown best in Fig. 1. These guide-columns B are open at their inner sides or the sides which face one another, as is shown in Fig. 2, and the columns at their lower portions are usually held in place by angle-irons 18, secured to the columns and to suitable bars 19, carried by the axles.

At the top of the body A these guide-columns B are passed between transverse beams 20, usually made of channel-iron, and opposing beams 20 are connected by a thrust-plate 21. Each thrust-plate 21, as is shown in Fig. 3, is provided with a central plain opening 22ª, also centrally located with respect to the upper ends of the columns B, and a screw 22 is passed through each of the openings 22ª into and through each guide-column B, as is also shown in Fig. 3. Each screw 22 is provided with upper collars 23 and 24, located one above and the other below the thrust-plate 21, through which the screw passes, and each screw is likewise provided at its upper end with a hand-wheel 25, the hand-wheels of the two screws being connected by a belt 26, so that upon operating one screw the other will be simultaneously operated.

The ends of the beam C are received in the columns B, and the said beam C is preferably in the form of an inverted U or is a channel-iron, as is shown particularly in Fig. 3. Adjacent to each end of the beam C interiorly-threaded sleeves 27 are provided, which receive the threaded portions of the screw-shafts 22, so that by turning the shafts 22 the beam C is raised or lowered, as may be required, and each screw-shaft 22 is provided with a collar 28 at its lower end below the lower face of the beam C. This beam carries a number of plow-shanks. The shanks are arranged one in advance of the other or one immediately behind the other and are secured in any desired manner at their upper ends to the bottom of the beam C, as is shown in Figs. 1 and 2, and the said shanks are given a downward and forward inclination, as is best shown in Fig. 1. Each shank is provided with a point at its lower end of any suitable formation, and any desired number of shanks may be employed.

In the drawings five shanks are shown, commencing at the rear the shanks being designated as D, D', $D^2$, $D^3$, and $D^4$, and their points are designated d, d', $d^2$, $d^3$, and $d^4$. The shanks are graduated in length, the point of the rearmost shank entering the ground to the greatest depth, while the point of the forward shank enters the ground to a slight depth only. The points of the said shanks are also graduated in width, as clearly shown in Fig. 2, the forward point $d^4$ being the widest and the rear point $d$ the narrowest. Thus it will be observed that as the implement is drawn forward each point performs a particular function and cuts into the ground a certain depth, while the combined action of all of the points produces a tapering groove, ditch, or furrow E, as is shown at Fig. 3, widest at the top and narrowest at the bottom, and as these grooves are to be used for irrigating purposes or to receive the rainfall or for purposes of accelerating growth contained in the grooves it is particularly desirable that the sides of the grooves shall not crumble away, and by the arrangement of the plows just mentioned this much-desired result is obtained.

Opposing colters or disk cutters 29 are connected by a hub 30. The hub is mounted to revolve on a suitable shaft 31, carried by bearings 32, secured to the forward end portion of the beam C at its sides, and the space between the colters or cutters 29 is slightly greater than the width of the advance plow-point $d^4$. These colters serve to produce clean or defining cuts on the surface of the ground in advance of the foremost plow-points.

I desire it to be understood that the details of construction relative to the frame and guides may be varied without departing from the spirit of the invention.

Having thus described my invention, I claim as new and desire to secure by Letters Patent—

1. In a plow, a beam, shanks of graduated lengths arranged tandem and secured directly to the said beam, and a point for each shank, which points are of graduated width, the rear point being the narrowest and entering the ground to the greatest depth, and the forward point being the widest and entering the ground to the least extent.

2. In a plow, a wheel-supported frame, a longitudinal beam carried by the frame, means for vertically adjusting the beam, and a plurality of independent and downwardly and forwardly inclined shanks arranged tandem and each having its upper end secured directly to the beam, the shanks being graduated in length, and points on the said shanks.

3. In a plow, a wheeled support, a beam vertically movable in the said support, adjusting devices for the end portions of the beam, which adjusting devices are carried by the said wheeled support, and shanks arranged tandem and secured directly to the beam, the shanks being of varying length, the rearmost shank the longest and the foremost shank the shortest.

4. In a plow, a wheeled support, a beam vertically movable in the said support, adjusting devices for the end portions of the beam, which adjusting devices are carried by the said wheeled support, shanks arranged tandem, secured directly to the beam, the shanks being of varying length, the rearmost shank the longest and the foremost shank the shortest, and colters carried by the forward portion of the beam and adapted to engage the ground in front of the forward shank, as described.

5. In a plow, a wheel-supported frame having vertical and spaced guideways at its forward and rear ends, a longitudinal beam having its ends working in said guideways, means for adjusting the ends of the beam, and a plurality of plows having their shanks secured to the beam one in rear of the other.

6. In a plow, a wheel-supported frame having vertical and spaced guideways, a longitudinal beam having its ends working in the guideways, means for simultaneously adjusting the ends of the beam, and a plurality of plows having their shanks secured to the beam one in rear of the other.

7. In a plow, a wheel-supported frame having vertical and spaced guideways at its forward and rear ends, a longitudinal beam having its ends working in the guideways, a plurality of plows secured to the beam, and screws working in the guideways and engaging with their lower ends the ends of the beam.

8. In a plow, a wheel-supported frame having vertical and spaced guideways at the forward and rear ends, said guideways being open on their inner sides, a longitudinal beam having its ends working in the guideways, a plurality of plows carried by the beam, screws working in the guideways and having their lower ends engaging the beam, a handwheel on the upper end of each screw, and a belt connecting the hand-wheels.

In testimony whereof I have signed my name to this specification in the presence of two subscribing witnesses.

WILLIAM MAULTBY BENSON.

Witnesses:
CHAS. H. BAKER,
P. GUILFOYLE.